(12) United States Patent
Sasaki (10) Patent No.: US 10,890,488 B2
(45) Date of Patent: Jan. 12, 2021

(54) RADIATION TEMPERATURE MEASURING DEVICE

(71) Applicant: ASAHI KASEI KABUSHIKI KAISHA, Tokyo (JP)

(72) Inventor: Hiroyuki Sasaki, Tokyo (JP)

(73) Assignee: Asahi Kasei Kabushiki Kaisha, Tokyo (JP)

(*) Notice: Subject to any disclaimer, the term of this patent is extended or adjusted under 35 U.S.C. 154(b) by 274 days.

(21) Appl. No.: 16/013,018

(22) Filed: Jun. 20, 2018

(65) Prior Publication Data

US 2018/0372547 A1   Dec. 27, 2018

(30) Foreign Application Priority Data

Jun. 22, 2017   (JP) .................. 2017-122171

(51) Int. Cl.
   *G01J 5/00*   (2006.01)
   *G01J 5/10*   (2006.01)
   (Continued)

(52) U.S. Cl.
   CPC .............. *G01J 5/00* (2013.01); *G01J 5/0275* (2013.01); *G01J 5/10* (2013.01); *G01J 5/602* (2013.01);
   (Continued)

(58) Field of Classification Search
   CPC .... G01J 5/00; G01J 5/0275; G01J 5/10; G01J 5/58; G01J 5/602; G01J 2005/0048; G01J 2005/0055
   See application file for complete search history.

(56) References Cited

U.S. PATENT DOCUMENTS

| 4,611,929 A | 9/1986 | Holyer |
| 5,270,528 A | 12/1993 | Ogikubo |
| 6,016,190 A | 1/2000 | Glazman |

FOREIGN PATENT DOCUMENTS

| JP | H02-134522 A | 5/1990 |
| JP | H06-082303 A | 3/1994 |

(Continued)

OTHER PUBLICATIONS

Tsai et al., Implementation of Remote Temperature-Measuring by Using a Thermopile for Wireless Sensor Network, 2012 7th IEEE Conference on Industrial Electronics and Applications (ICIEA), pp. 1325-1328 (Year: 2012).*

(Continued)

*Primary Examiner* — Toan M Le
(74) *Attorney, Agent, or Firm* — Morgan, Lewis & Bockius LLP (57) ABSTRACT

A radiation temperature measuring device includes: an infrared sensor that detects a wavelength including an absorption band by atmosphere; an absorption rate calculation unit that calculates an absorption rate by the atmosphere when measuring a surface temperature of an object from output of the infrared sensor; an output storage unit that stores conversion information for converting the output of the infrared sensor into the surface temperature of the object; a surface temperature calculation correction unit that calculates the surface temperature of the object from the output of the infrared sensor, the absorption rate calculated by the absorption rate calculation unit, and the conversion information; and an absorption rate storage unit that stores in advance the absorption rate by the atmosphere when the conversion information is set, in which the calculated surface temperature of the object is corrected with the absorption rate stored in the absorption rate storage unit.

6 Claims, 4 Drawing Sheets

(51) Int. Cl.
    *G01J 5/02*      (2006.01)
    *G01J 5/60*      (2006.01)
    *G01J 5/58*          (2006.01)

(52) U.S. Cl.
    CPC ......... *G01J 5/58* (2013.01); *G01J 2005/0048* (2013.01); *G01J 2005/0055* (2013.01)

(56) References Cited

FOREIGN PATENT DOCUMENTS

| | | |
|---|---|---|
| JP | H08-035884 A | 2/1996 |
| JP | H10-096667 A | 4/1998 |
| JP | H10-318844 A | 12/1998 |
| JP | H11-512529 A | 10/1999 |
| JP | 2014-044091 A | 3/2014 |

OTHER PUBLICATIONS

Tetsuo Tamura et al., "Development of 5.5 to 7.9 μm Thermography Device and Application Thereof", Journal of the Japan Society of Infrared Science and Technology, Dec. 1998, 8(2), p. 39-47. (with partial translation).

\* cited by examiner

RADIATION TEMPERATURE MEASURING DEVICE

CROSS REFERENCE TO RELATED APPLICATIONS AND INCORPORATION BY REFERENCE

This application claims benefit of priority under 35 USC 119 based on Japanese Patent Application No. 2017-122171 filed on Jun. 22, 2017, the entire contents of which are incorporated by reference herein.

TECHNICAL FIELD

The present invention relates to a radiation temperature measuring device using an infrared sensor.

BACKGROUND ART

Conventionally, a device configured to measure a temperature of an object without contact using an infrared sensor has been known. Examples of application products thereof include a radiation thermometer (non-contact thermometer) and a thermography (infrared camera). An actual measurement principle of the device uses the fact that radiation electromagnetic energy of the object is determined only by the temperature of the object. More specifically, radiation energy of an infrared wavelength band that makes up a large part of the radiation electromagnetic energy of the object can be measured by the infrared sensor. The temperature of the object is calculated from a measurement value of the energy.

The wavelength of the infrared sensor that is most manufactured and used currently is a band of 8 μm to 14 μm (hereinafter, referred to as far-infrared band). The reason is that the wavelength in which the radiation energy becomes the largest is the far-infrared band of about 10 μm in the vicinity of a temperature in our living environment (about 300 kelvin). Accordingly, a measurement result having a characteristic similar to the Stefan-Boltzmann Fourth-Power Law obtained by integrating all electromagnetic wavelength bands can be obtained when compared to other wavelength bands.

In contrast, an unfavorable measurement result is sometimes brought by the method. This is the case when measuring a temperature of a reflective object, such as glass, with a radiation thermometer. As is well known, glass has a reflection component of about 4% in a visible light band. However, a reflection rate becomes quite large, about 20%, in the above-described far-infrared band. The influence has brought deterioration of accuracy in a temperature measurement with the conventional radiation thermometer.

SUMMARY

According to an aspect of the present invention, there is provided a radiation temperature measuring device configured to measure a surface temperature of an object without contact using an infrared sensor, the radiation temperature measuring device including: the infrared sensor configured to detect a wavelength including an absorption band by atmosphere existing between the infrared sensor and the object; a measuring means configured to measure output of the infrared sensor; an absorption rate calculating means configured to calculate an absorption rate by the atmosphere at a wavelength of the absorption band when the surface temperature of the object is measured by the measuring means; a storing means configured to store in advance conversion information for converting the output of the infrared sensor into the surface temperature of the object; a surface temperature calculating means configured to calculate the surface temperature of the object from the output of the infrared sensor measured by the measuring means, the absorption rate calculated by the absorption rate calculating means, and the conversion information stored in the storing means; an absorption rate storing means configured to store in advance the absorption rate by the atmosphere at the wavelength of the absorption band depending on the conversion information; and a correcting means configured to correct the surface temperature of the object calculated by the surface temperature calculating means using the absorption rate stored in the absorption rate storing means.

According to another aspect of the present invention, there is provided a radiation temperature measuring device configured to measure a surface temperature of an object without contact using an infrared sensor, the radiation temperature measuring device including: the infrared sensor configured to detect a wavelength including an absorption band by atmosphere existing between the infrared sensor and the object; a measuring means configured to measure output of the infrared sensor; an absorption rate calculating means configured to calculate an absorption rate by the atmosphere at a wavelength of the absorption band when the surface temperature of the object is measured by the measuring means; a storing means configured to store a preset conversion equation for converting the output of the infrared sensor into the surface temperature of the object, which includes a coefficient indicating a characteristic of the infrared sensor, and a pre-detected value of the coefficient indicating the characteristic of the infrared sensor; a surface temperature calculating means configured to calculate the surface temperature of the object from the output of the infrared sensor measured by the measuring means, the absorption rate calculated by the absorption rate calculating means, and the conversion equation including the value of the coefficient stored in the storing means; and an absorption rate storing means configured to store in advance the absorption rate by the atmosphere at the wavelength of the absorption band when the value of the coefficient stored in the storing means is detected, wherein the surface temperature calculating means calculates the surface temperature of the object using the conversion equation corrected by the absorption rate stored in the absorption rate storing means.

According to still another aspect of the present invention, there is provided a radiation temperature measuring device configured to measure a surface temperature of an object without contact using an infrared sensor, the radiation temperature measuring device including: the infrared sensor configured to detect a wavelength including an absorption band by atmosphere existing between the infrared sensor and the object; a measuring means configured to measure output of the infrared sensor; an absorption rate calculating means configured to calculate an absorption rate by the atmosphere at a wavelength of the absorption band when the surface temperature of the object is measured by the measuring means; a storing means configured to store preset conversion information for converting the output of the infrared sensor into the surface temperature of the object; an absorption rate storing means configured to store in advance the absorption rate by the atmosphere at the wavelength of the absorption band when the conversion information is set; and a calculating means configured to calculate the surface temperature of the object from the output of the infrared sensor measured by the measuring means, the absorption rate calculated by the absorption rate calculating means, the absorption rate stored in the absorption rate storing means, and the conversion information stored in the storing means.

DETAILED DESCRIPTION

As described above, a technology for overcoming the problem of the reflection generated when measuring the temperature is described in Tetsuo Tanaka et al., "Development of 5.5 to 7.9 μm Thermography Device and Application Thereof", Journal of the Japan Society of Infrared Science and Technology, December 1998, 8(2), p. 39-47 (hereinafter referred to as "Tanaka"). According to a method of Tanaka, it is clearly stated that, in order to reduce the large reflection component generated on the glass surface, a wavelength of about 5 μm to 8 μm (hereinafter, referred to as middle-infrared band) having a small reflection rate, which is different from the far-infrared band used in a normal radiation thermometer or thermography, is detected.

However, as described in the present literature, the middle-infrared band is also an absorption band of water vapor ($H_2O$). In Tanaka, a means, a model, and a calculation equation for correcting the absorption influence of water vapor existing in the measurement space are clearly stated. Put briefly, the means uses the Kirchhoff's laws according to which an absorption rate and an emission rate of an electromagnetic wave from gas are equal. More specifically, since there is the absorption influence of water vapor, infrared energy that reaches the object from the glass becomes smaller by the amount corresponding to the absorption rate of water vapor. Furthermore, infrared energy of an emission rate that is equal to the absorption rate is emitted to the object from water vapor itself. In Tanaka, a correction calculation equation is written while considering that there is the foregoing energy change in an infrared sensor configured to detect the middle-infrared band.

Although the means and the principle are certainly right, there are the following two problems in actually performing a temperature measurement of glass with a radiation thermometer.

Firstly, the gas absorption in the middle-infrared band is not limited to water vapor, as being pointed out by the authors themselves also in Tanaka. Well-known examples include carbon dioxide ($CO_2$) and methane ($CH_4$). In particular, carbon dioxide has a significant influence when a measurement distance is long and cannot be ignored in some cases.

Secondly, in the first place, a measurement in which the absorption influence of water vapor is made completely zero is impossible in the reality environment. In principle, a distance between the object and the infrared sensor should be made zero or a relative humidity (an absolute humidity is acceptable) should be made zero, but it is clear that both are irrealizable.

A preceding patent most similar to Tanaka is JP H-08-35884 A. However, it is clearly stated that only an absorption band of water vapor, in particular, a wavelength of about 5 μm to 8 μm is detected in JP H-08-35884 A, and correction of the absorption influence of water vapor is not mentioned and suggested at all. Naturally, a correcting means is not described at all.

On the other hand, it is stated that an infrared sensor configured to detect a wavelength of about 5 μm to 8 μm is used in JP 2014-044091 A. This itself is similar to Tanaka and JP H-08-35884 A, but JP 2014-044091 A is a technology for not performing correction calculation of a radiation temperature using a separately-measured humidity in Tanaka but, in an opposite manner, for further determining a humidity (in an environment) on the basis of output of the infrared sensor and a temperature of an object determined from the output.

The embodiment has been made in view of the conventional unsolved problems, and an object of the embodiment is to provide a radiation temperature measuring device capable of reducing an absorption influence of water vapor, carbon dioxide, methane, and the like even when an infrared sensor configured to detect a middle-infrared band in which water vapor absorption is large is used.

In the following detailed description, a number of particular specific configurations will be described for providing complete understanding of embodiments of the present invention. However, it is clear that other embodiments are practicable without limiting to such particular specific configurations. In addition, the following embodiments do not limit the invention according to claims but include all combinations of characteristic configurations described in the embodiments.

Hereinafter, one embodiment of the present invention will be described with reference to the drawings. In the following description of the drawings, the same portions are denoted by the same reference numerals. However, the drawings are schematic.

Configuration of Embodiment

Figure 1:
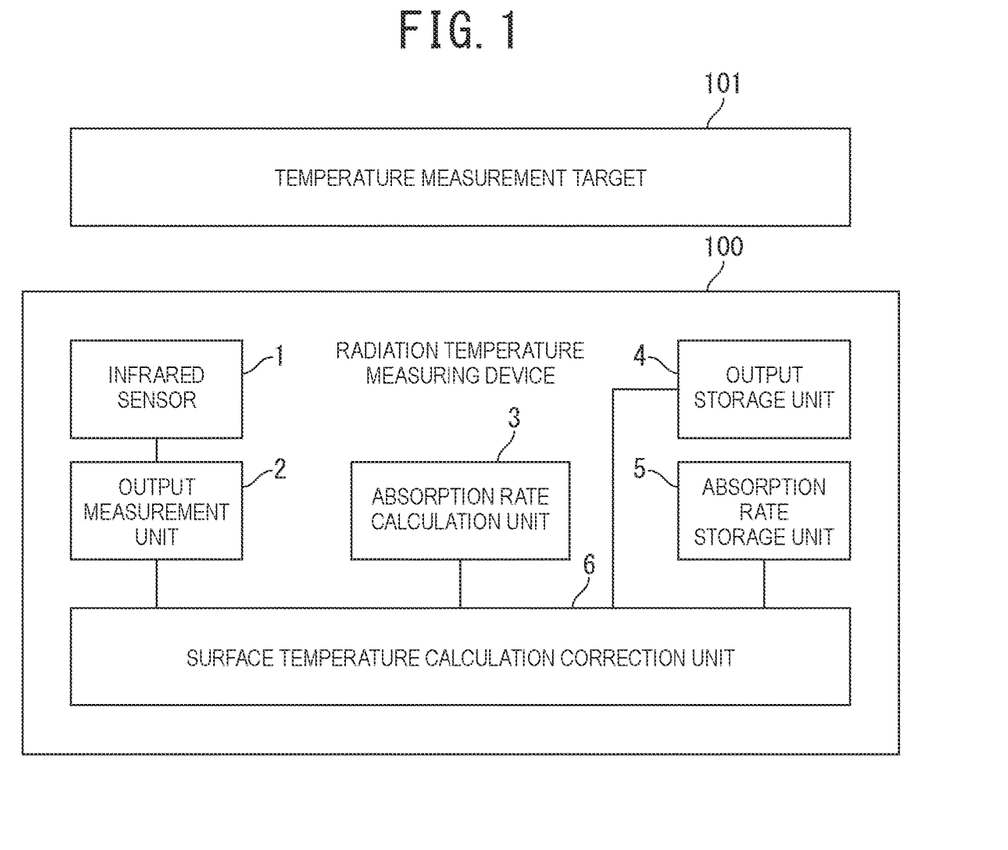
FIG. 1 is a functional block diagram illustrating a radiation temperature measuring device according to an embodiment of the present invention.

FIG. 1 is a functional block diagram illustrating a configuration example of an embodiment of a radiation temperature measuring device 100 according to the present invention.

In FIG. 1, a reference numeral 1 denotes an infrared sensor. When measuring a temperature of glass (in the case of one embodiment of the present invention), in order to suppress a reflection influence of the glass, preferably, the infrared sensor 1 has a wavelength band of not the conventional far-infrared band (8 μm to 14 μm) but a middle-infrared band (5 μm to 8 μm).

A reference numeral 2 denotes an output measurement unit and is a block (measuring means) configured to measure the output of the infrared sensor 1. As in general sensors, the output measurement value of the infrared sensor 1 outputted from the output measurement unit 2 is outputted as a digital value or an analog voltage value.

A reference numeral 3 denotes an absorption rate calculation unit and is a block (absorption rate calculating means) configured to calculate an absorption rate of water vapor ($H_2O$) exiting between a temperature measurement target 101 whose surface temperature is to be measured and the infrared sensor 1. A specific means for calculating the $H_2O$ absorption rate will be described below.

A reference numeral 4 denotes an output storage unit. The output storage unit 4 is attributed to the output measurement value of the infrared sensor 1 outputted from the output measurement unit 2 being a digital value or an analog voltage value. More specifically, when actually using the radiation temperature measuring device 100, it should be known in advance that how much physical quantity (the surface temperature of the temperature measurement target 101 in the case of the embodiment of the present invention) the output value of the output measurement unit 2 corresponds to. In other words, the output storage unit 4 is a block (storing means) for storing the already-known information ("conversion information into the surface temperature from the output measurement value" of the infrared sensor 1 outputted from the output measurement unit 2 in the case of the embodiment of the present invention).

A reference numeral 5 denotes an absorption rate storage unit (absorption rate storing means). Information and a value to be stored in the absorption rate storage unit 5 will be described below. In the conventional technology, the output storage unit 4 was included, but there was no device including the absorption rate storage unit 5. In the embodiment of the present invention, the absorption rate storage unit 5 performs storage in association with "the conversion information into the surface temperature from the output measurement value" stored in the output storage unit 4. By newly providing the absorption rate storage unit 5, the radiation temperature measuring device 100 configured to more precisely perform correction of the $H_2O$ absorption influence can be provided.

A reference numeral 6 denotes a surface temperature calculation correction unit (surface temperature calculating means, correcting means, calculating means). The surface temperature calculation correction unit 6 converts the output measurement value from the output measurement unit 2 into the surface temperature of the temperature measurement target 101. The surface temperature calculation correction unit 6 calculates the surface temperature Tb using not only "the conversion information into the surface temperature from the output measurement value" stored in the output storage unit 4 but also a storage value stored in the absorption rate storage unit 5.

Figure 2:
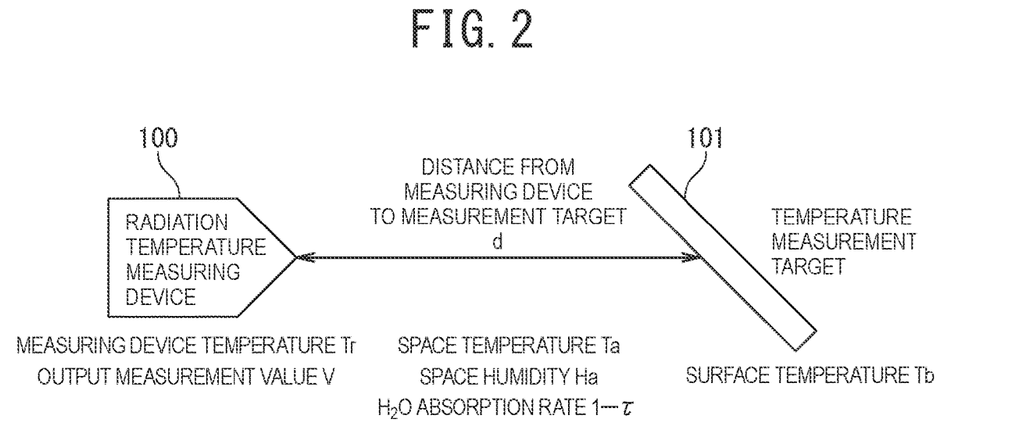
FIG. 2 is a schematic diagram illustrating a measuring system of a radiation temperature measuring device 100 and a temperature measurement target 101.

FIG. 2 is a schematic diagram illustrating a measuring system of the radiation temperature measuring device 100 and the temperature measurement target 101. Furthermore, physical quantities to be directly measured and physical quantities obtained first by the radiation temperature measuring device 100 are written in the schematic diagram by character expressions. The details of the respective physical quantities are as follows.

Output Measurement Value V: The output measurement value V indicates the output value of the output measurement unit 2. The output measurement value V is a quantity that can be directly measured.

Temperature of Radiation Temperature Measuring Device 100 (hereinafter, referred to as Measuring Device Temperature) Tr: Most generally, a small contact-type thermometer (thermocouple or the like) is attached to the infrared sensor 1. The measuring device temperature Tr is a quantity that can be directly measured.

Surface Temperature Tb: The surface temperature Tb is a measurement quantity indicating the surface temperature of the temperature measurement target 101, which is obtained from the output measurement value V indicating the output of the infrared sensor 1 on the basis of "the conversion information into the surface temperature from the output measurement value" stored in advance. As just described, the surface temperature Tb is a quantity obtained first by the radiation temperature measuring device 100 according to the embodiment of the present invention and is not a quantity that can be directly measured.

Distance d from Radiation Temperature Measuring Device 100 to Temperature Measurement Target 101: The distance d is a physical quantity that influences on a $H_2O$ transmission rate described below. The distance d is obviously a quantity that can be measured.

Space Temperature Ta: The space temperature Ta is a temperature in space between the radiation temperature measuring device 100 and the temperature measurement target 101. The space temperature Ta is a quantity that can be directly measured. Since the radiation temperature measuring device 100 is placed in space at a uniform temperature in many cases, the space temperature Ta becomes the same temperature as the temperature Ts of the radiation temperature measuring device 100.

Space Humidity Ha: The space humidity Ha is a humidity in the space between the radiation temperature measuring device 100 and the temperature measurement target 101. When measuring the space humidity Ha together with the space temperature Ta, a relative humidity only has to be measured. In contrast, when an absolute humidity can be measured, the temperature measurement of the space becomes unnecessary.

$H_2O$ Absorption Rate $1-\tau$: The $H_2O$ absorption rate $1-\tau$ can be determined from the above-described distance d, space temperature Ta, and space humidity Ha, and various other quantities. Since the reflection rate of $H_2O$ molecules is generally zero, when the transmission rate is $\tau$, the absorption rate can be expressed as $1-\tau$.

Figure 3:
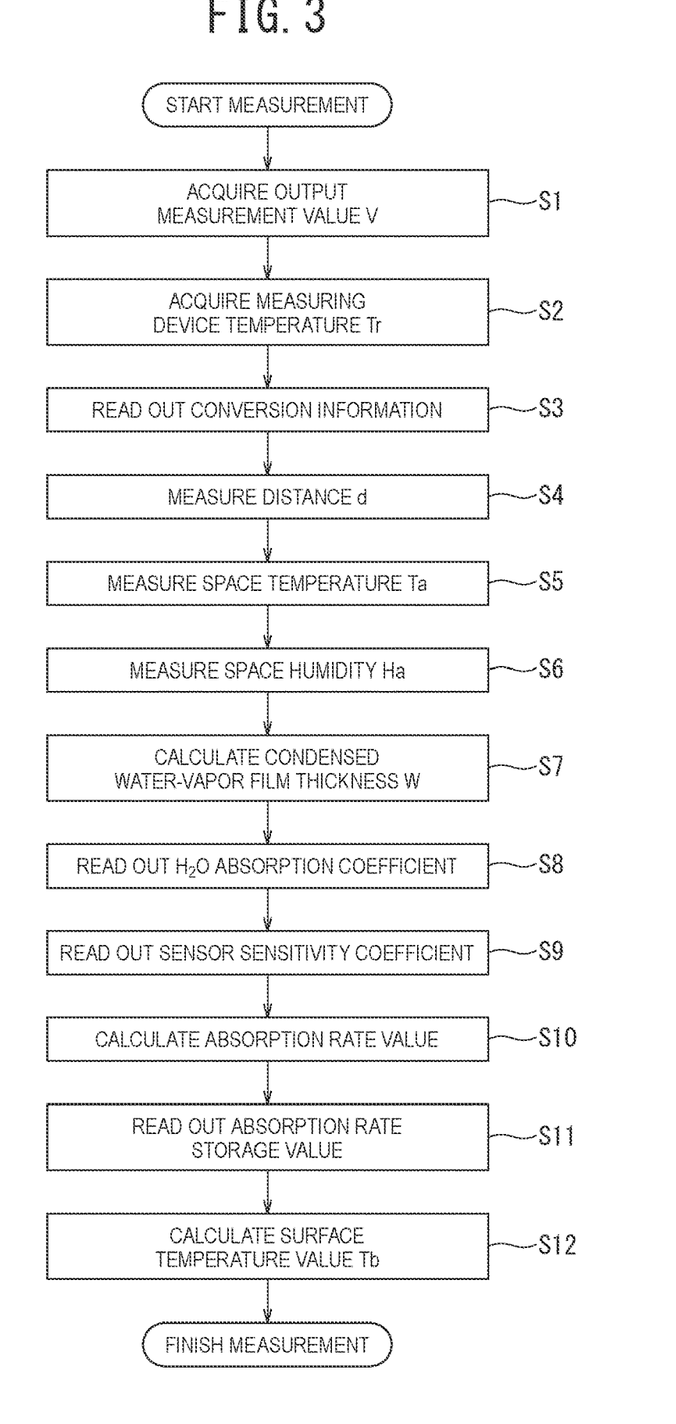
FIG. 3 is a flow chart illustrating an example of an operation of the radiation temperature measuring device 100.

Next, a determining method of the surface temperature Tb in the radiation temperature measuring device 100 will be illustrated by a flow chart of FIG. 3 on the basis of FIG. 1 and FIG. 2. It is to be noted that the flow chart is an example, all are not essential items, and the order is not limited thereto.

When the radiation temperature measuring device 100 is instructed to start the measurement, the radiation temperature measuring device 100 first acquires the output measurement value V of the output measurement unit 2 configured to determine the output of the infrared sensor 1 (step S1) and acquires the temperature of the infrared sensor 1 as the measuring device temperature Tr by the measurement (step S2). In addition, "the conversion information into the surface temperature from the output measurement value" stored in the output storage unit 4 is read out (step S3). How to store the conversion information is broadly classified into two ways. The first way is a method of determining the surface temperature Tb of the temperature measurement target 101 by storing an already-known equation including an already-known coefficient, and the second way is a method of storing the output measurement value V, the measuring device temperature Tr, and the surface temperature Tb as a numerical table. The former first way is more suitable in the embodiment of the present invention, and thus, only the first way will be described in the following description.

The most theoretical and precise specific example of the first way is an example using the Stefan-Boltzmann Fourth-Power Law regarding black-body radiation. At this time, the output measurement value V, the measuring device temperature Tr, and the surface temperature Tb are associated by the following equation indicated in Example 1.

$$V = b(Tb^4 - Tr^4) + c \quad \text{(Example 1)}$$

Here, b and c in the equation of Example 1 are coefficients stored in advance in the output storage unit 4, b corresponds to sensitivity of the infrared sensor 1, and c corresponds to an offset of the infrared sensor 1. The surface temperature Tb can be acquired by solving the equation with Tb.

Other examples include the following Example 2 to Example 4.

$$V = b(Tb - Tr) + c \quad \text{(Example 2)}$$

The equation indicated in Example 2 is basically a first-order approximation of the fourth-order equation indicated in Example 1. It is used when the temperature range is narrow, and the accuracy may be moderate, but the calculation load is wanted to be reduced.

$$V = b(Tb^n - Tr^n) + c \quad \text{(Example 3)}$$

The equation indicated in Example 3 is an equation including implications as follows. More specifically, the Stefan-Boltzmann formula of the fourth-order equation indicated in Example 1 is directed to, in terms of a detection band, not only the infrared band but also all wavelength bands. However, it is impossible to make an infrared sensor having the foregoing detection band in actuality, and the band needs to be limited, but the equation is not necessarily expressed by a fourth-order equation when limiting the band in this manner. The equation indicated in Example 3 is an equation used when an order is also stored as an undetermined coefficient in the equation indicated in Example 1.

$$V = b[f(Tb) - f(Tr)]c \quad \text{(Example 4)}$$

The equation indicated in Example 4 is the most general, and f is not clearly specified. However, in any case, the method of determining Tb from the equations indicated in Example 1 to Example 4 was a conventional calculation method of the surface temperature Tb (hereinafter, referred to as a conventional first method).

Subsequently, the next stage of the flow chart (step S4 to step S10) will be described as a conventional second method. The next step is a flow for calculating the absorption rate 1−τ or the transmission rate τ.

When "the conversion information into the surface temperature from the output measurement value" can be read out in step S3, next, the distance d (step S4), the space temperature Ta (step S5), and the space humidity Ha (step S6) are measured. A condensed water-vapor film thickness W is calculated on the basis of the distance d, the space temperature Ta, and the space humidity Ha (step S7). Furthermore, a $H_2O$ absorption coefficient of each wavelength in the infrared band (step S8) and a sensitivity coefficient of each wavelength of the infrared sensor 1 (the band is the middle-infrared band (5 μm to 8 μm)) (step S9) are read out, and an absorption rate value is calculated (step S10).

Hereinafter, the meaning of the physical quantities and a determining method of the transmission rate τ will be described.

First, regarding the distance d, when the radiation temperature measuring device 100 and the temperature measurement target 101 have a relationship of moving in the same manner although they are located at distance places, the measurement only has to be performed once first. For example, a relationship between a rear-view mirror and a windshield of a vehicle corresponds to this relationship. In contrast, a general radiation thermometer is a so-called gun type, and thus, the radiation temperature measuring device 100 moves independently of the temperature measurement target 101. In this case, the distance d needs to be measured every time. Therefore, the embodiment of the present invention is unsuitable for a general gun-type radiation thermometer.

On the other hand, regarding the space temperature Ta and the space humidity Ha, the measurement itself is relatively simple, but a thermometer and a hygrometer should not be put in a manner that blocks the measured view of the radiation temperature measuring device 100. The reason is that, when the thermometer and the hygrometer are put in this manner, the temperatures of a space thermometer and a space hygrometer also influence on the output measurement of the infrared sensor.

Next, the condensed water-vapor film thickness W is calculated on the basis of the already obtained distance d, space temperature Ta, and space humidity Ha. The condensed water-vapor film thickness W is a numerical value indicating to what degree the thickness becomes if all $H_2O$ molecules are condensed in given space. Naturally, the condensed water-vapor film thickness W increases as the space becomes larger (longer one-dimensionally), and the condensed water-vapor film thickness W also increases when the temperature and humidity increase. Specifically, the condensed water-vapor film thickness W is determined by the following procedure.

A saturation water vapor pressure or the amount of saturation water vapor is calculated from the space temperature Ta.

An absolute humidity is determined from the amount of saturation water vapor and the space humidity Ha.

By multiplying the absolute humidity by 1 m^3, the weight of water vapor existing in space of one cubic meter is found.

By dividing the weight of water vapor existing in the space of one cubic meter by the density of water, (the ratio of) a condensed water-vapor film thickness with respect to a distance of one meter is determined.

By multiplying the ratio of the condensed water thickness by the actual distance d, the condensed water-vapor film thickness W of the distance can be calculated.

Calculation with specific numerical values is as follows.

When the space temperature Ta is 25° C., the amount of saturation water vapor is 23 g/m^3. This can be determined from, for example, the Tetens equation and a state equation of ideal gas.

When the space humidity Ha is 50%, the absolute humidity is 11.5 g/m^3.

Thus, the weight of water vapor existing in 1 m^3 is 11.5 g.

The density of water is approximately 1 g/cm^3, i.e. 1 ton/m^3 at a height of 0 m above sea level and a temperature of 4° C. Therefore, the condensed water-vapor film thickness per the distance of one meter is determined as 11.5 micrometers (μm).

When the distance d is 10 cm, the condensed water-vapor film thickness W is 1.15 μm.

Subsequently, the $H_2O$ absorption coefficient in the middle-infrared band will be described in detail.

As described in also each cited literature, a band called "an atmospheric window" exists in the infrared band (the wavelength band of 0.8 μm to 1000 μm). For example, there is little infrared absorption by the atmosphere at 8 μm to 14 μm. In contrast, the infrared rays are absorbed by $H_2O$ in the atmosphere at 5 μm to 8 μm (middle-infrared band) that is the wavelength band of the infrared sensor 1 in the embodiment of the present invention. As described above, the absorption rate varies depending on the wavelength. Therefore, a numerical value (information) of the $H_2O$ absorption coefficient of each wavelength is needed.

Although there are various methods of expressing the numerical value of the $H_2O$ absorption coefficient, the Lambert-Beer law relating to the above-described condensed water-vapor film thickness W and the absorption is used in the embodiment of the present invention. According to the Lambert-Beer law, the transmission rate τ and the condensed water-vapor film thickness W at a certain limited wavelength are linked by a relation equation indicated in the following equation (1).

$$\tau = \exp(-\alpha W) \quad (1)$$

Here, α in the equation (1) is a coefficient indicating the degree of absorption per unit length, and, in the embodiment of the present invention, is defined as a coefficient in which the transmission rate becomes 1/e when the condensed water-vapor film thickness W is 1 mm. Hereinafter, α will be referred to as a $H_2O$ absorption coefficient in the present description, and e is a base of natural logarithm.

As indicated in the equation (1), when α is large, the transmission rate τ is small, more specifically, the absorption rate is large, and thus, the $H_2O$ absorption coefficient τ is the coefficient indicating the degree of absorption as described above.

Figure 4:
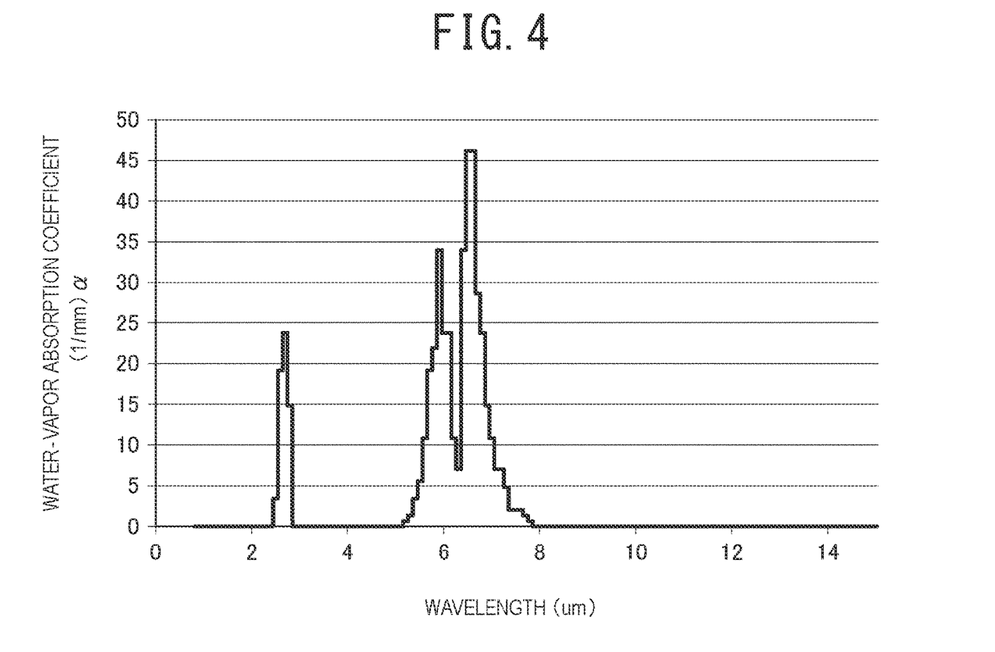
FIG. 4 is a graph illustrating an example of a water-vapor absorption coefficient in an infrared band.

FIG. 4 illustrates an example of a result obtained by measuring the $H_2O$ absorption coefficient α across the infrared wavelength (0.8 μm to 15 μm). As can be seen from the graph, the $H_2O$ absorption coefficient α is approximately zero in the far-infrared band (8 μm to 14 μm) of the conventional radiation thermometer. This means that the transmission rate τ=1. However, the $H_2O$ absorption coefficient α has a significant value in the middle-infrared band (5 μm to 8 μm). When providing a specific example with a numerical value from the graph, the $H_2O$ absorption coefficient α when the infrared wavelength is 6.5 μm is about 46 (1/mm). On the other hand, the condensed water-vapor film thickness W=1.15 μm when the distance d=10 cm, and thus, by substituting these values into the equation (1), τ=exp(46× 1.15÷1000)=0.948 . . . is obtained, more specifically, $H_2O$ absorption of about 5% exists even in space having a small size of about 10 cm.

Finally, the sensitivity coefficient of the infrared sensor 1 will be described.

Also regarding the sensitivity coefficient of the infrared sensor 1, basically, a numerical value of the sensitivity coefficient is needed for each wavelength as in the above $H_2O$ absorption coefficient α. Here, an absolute value of the sensitivity coefficient is unnecessary, and a relative value of the sensitivity at each wavelength based on a certain infrared wavelength only has to be found. This is because the $H_2O$ absorption rate and transmission rate are determined here, and thus, a ratio between the case with no $H_2O$ absorption and the case with $H_2O$ absorption only has to be determined.

Furthermore, in a so-called heat-detection-type infrared sensor, generally, the sensitivity is not dependent on the infrared wavelength. Thus, in the heat-detection-type infrared sensor, when considering in combination with the above-described first point (the relative value of the sensitivity only has to be found), the sensitivity coefficient value itself of the infrared sensor 1 does not need to be considered. However, when an infrared filter is used in combination with the infrared sensor 1, the filter properties need to be considered, and thus, attention is required.

By expressing the transmission rate τ under the $H_2O$ absorption influence by a specifically calculating equation on the basis of the above description, an integration in the infrared wavelength band indicated in the following equation (2) is given.

[Math 1]

$$\tau = \frac{\int IR(\lambda) \cdot \exp(-\alpha(\lambda) \cdot W) \cdot )Pl(\lambda) d\lambda}{\int IR(\lambda) \cdot Pl(\lambda) d\lambda} \quad (2)$$

Here, in the equation (2), IR(λ) is the sensitivity coefficient of the infrared sensor 1 (and considering also the infrared filter and the like) and Pl(λ) is Planck distribution in the space temperature Ta. When looking at the equation (2), it can be found that the above-described equation τ=exp(−αW) (equation (1)) is in an exceptional case in which the wavelength is limited to an extremely narrow range (or there is no wavelength dependency) in this equation.

It is to be noted that, although the calculation method of the transmission rate τ has been described above in detail, this calculation is completely unnecessary when the transmission rate τ is already known. Similarly, when the quantity equivalent to the above-described each quantity is obtained, it may be used. For example, if the space temperature Ta and the space humidity Ha are not known, when the absolute humidity in the same space is known, the absolute humidity can be substituted.

By using the conventional second method that has been described above, the following change may be made for the conventional first method, and furthermore, the following effect is indicated.

The absorption rate and the transmission rate of the water vapor ($H_2O$) being 1−τ and τ means that, as indicated in the following equation (3), the amount of infrared light coming from the temperature measurement target 101 into the radiation temperature measuring device 100 is changed from when not considering $H_2O$ absorption and transmission=f (Tb) to when considering $H_2O$ absorption and
transmission=$\tau f(Tb)+(1-\tau)f(Ta)$ (3).

(The general equation indicated in Example 4 among the respective equations indicated in Example 1 to Example 4 described above is used.) In other words, the amount of infrared light passing through the space from the temperature measurement target 101 decreases from f(Tb) to Tf(Tb). On the other hand, according to the Kirchhoff's laws, the ratio of energy absorbed by the water vapor in the space (absorption rate) is equal to the ratio of energy to be emitted from the water vapor in the space (emission rate), and thus, the amount of infrared light to be emitted from $H_2O$ changes from zero to (1−τ)f(Ta). Therefore, the amount of infrared light coming into the radiation temperature measuring device 100 becomes the above equation (3).

On the basis of this, when V is expressed by the general equation, the n-th order equation, and the fourth-order equation, respectively, Tb may be determined by solving the following equations (4) with Tb.

$$V = b[\{\tau f(Tb) + (1-\tau)f(Ta)\} - f(Tr)] + c$$

$$V = b\{\tau Tb\char`\^n + (1-\tau)Ta\char`\^n - Tr\char`\^n\} + c$$

$$V = b\{\tau Tb\char`\^4 + (1-\tau)Ta\char`\^4 - Tr\char`\^4\} + c \quad (4)$$

In the case of the first-order equation, it is easy to solve the equation with Tb, and the following equation (5) is obtained.

$$Tb = [(V-c) \div b - (1-\tau)Ta + Tr] \div \tau \quad (5)$$

The method of determining Tb from these equations (equations (4)) is the conventional calculation method of the surface temperature Tb (conventional second method).

Finally, the radiation temperature measuring device 100 and the calculation method of the surface temperature Tb in the embodiment of the present invention will be described.

The radiation temperature measuring device 100 in the embodiment of the present invention is obtained by newly adding the absorption rate storage unit 5 illustrated in FIG. 1 in a conventional radiation temperature measuring device, and the storage value is newly considered in the calculation process of the surface temperature Tb of the temperature measurement target 101. In other words, as illustrated in steps S11 and S12 of FIG. 3, the storage value stored in the absorption rate storage unit 5 is read out, and the surface temperature Tb of the temperature measurement target 101 is calculated in consideration of the storage value.

Actually, by enumerating calculation equations using a transmission rate $\tau 0$ corresponding to the transmission rate $\tau$ as the storage value, the following equations (6) are obtained.

$$V = b[[(\tau/\tau 0) \cdot f(Tb) + (1-(\tau/\tau 0)) \cdot f(Ta)] - f(Tr)] + c$$

$$V = b8 \; (\tau/\tau 0) \cdot Tb\char`\^n + (1-(\tau/\tau 0)) \cdot Ta\char`\^n - Tr\char`\^n\} + c$$

$$V = b[(\tau/\tau 0) \cdot Tb\char`\^4 + (1-(\tau/\tau 0)) \cdot Ta\char`\^4 - Tr\char`\^4] + c \quad (6)$$

In the case of the first-order equation, it is easy to solve the equation with Tb, and the following equation (7) is obtained.

$$Tb = [(V-c) \div b - (1-(\tau/\tau 0)) \cdot Ta + Tr] \div (\tau/\tau 0) \quad (7)$$

When comparing the calculation equation (7) in the embodiment of the present invention with the above (the first-order equation by the conventional second method (the equation (5))), it can be found that $\tau$ in the equation (5) is substituted with $(\tau/\tau 0)$ in the equation (7). The meaning and effect thereof will be described below.

In the case of the first-order equation by the conventional second method not including the absorption rate storage unit 5 and out of consideration of the storage value, which is indicated in the equation (5), it can be found that, from a comparison with the calculation equation (7) in the embodiment of the present invention, the calculation is actually performed on the assumption of $\tau 0 = 1$. In other words, when calculating the temperature of the temperature measurement target 101 by storing the already-known equation including the already-known coefficient in the output storage unit 4, it is a major premise that absorption by $H_2O$ does not exist in an environment of the storing step.

However, the major premise is established only in an ideal case and is never established in the reality environment. This is because, in the first place, it is impossible to determine the coefficients that should be stored in the output storage unit 4 (the sensitivity b, the offset c, an exponent (order) n in the calculation equation (6), and the like) under a condition where the $H_2O$ absorption does not exist. In other words, actually, these coefficient values are coefficient values obtained first by concurrently measuring the surface temperature Tb of the temperature measurement target 101, the output measurement value V of the infrared sensor 1, and the like. In order to make the condition where the $H_2O$ absorption does not exist in this measurement, there is no way but to make the distance between the temperature measurement target 101 and the infrared sensor 1 zero or make the relative humidity (the absolute humidity is acceptable) zero, but both are impossible measurements.

Generally, a step of obtaining numerical values, such as these coefficients b, c, is called calibration, and is a step that is always performed also in another sensor (an acceleration sensor, a magnetic sensor, or the like) without limiting to the infrared sensor, but the $H_2O$ absorption influence is always generated when performing the reality measurement in the step. The conventional technology overlooks the influence.

Figure 5:
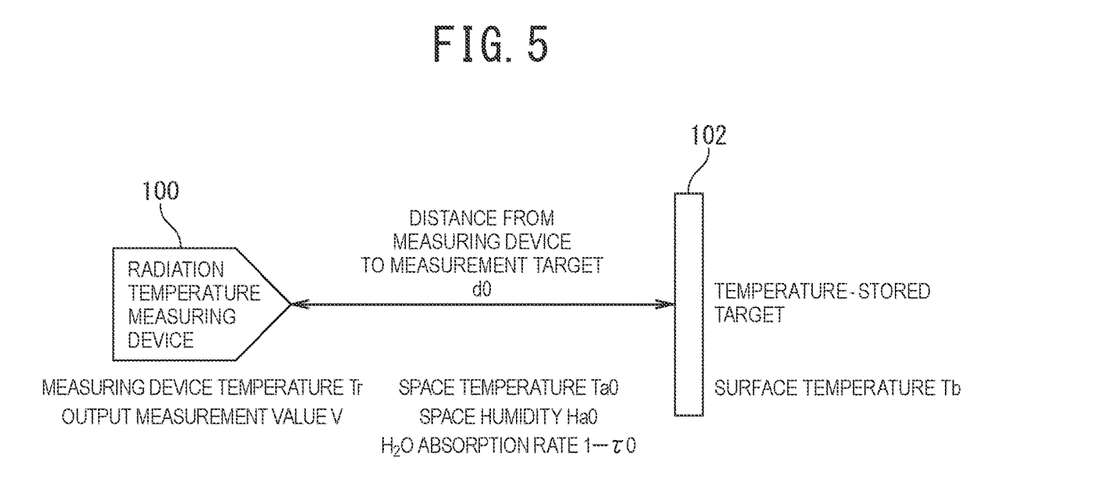
FIG. 5 is an explanatory diagram schematically illustrating an example of a measuring system when measuring storage information for an output storage unit 4 and an absorption rate storage unit 5.

FIG. 5 is a schematic diagram illustrating an example of a measuring system in the calibration step, and, in the calibration step, the radiation temperature measuring device 100 acquires the various coefficients and the like stored in the output storage unit 4 and the absorption rate storage unit 5 using a temperature-stored target 102. As illustrated in FIG. 5, little difference exists between the measuring system in the calibration step and the measuring system that has been described above (refer to FIG. 2). However, the surface temperature Tb that is unknown in FIG. 2 needs to be measured by another means in the case of the calibration step of FIG. 5. Furthermore, as also described above, the above-described coefficients b, c, and the like become first already-known numerical values (become not unknown values) by performing the calibration step illustrated in FIG. 5. Determining of the transmission rate $\tau$ in the same procedure as the above in the calibration step corresponds to, i.e. determining of $\tau 0$. The determined $\tau 0$ may be stored in the absorption rate storage unit 5 as the transmission rate during the calibration. As described above, a determining method of the transmission rate $\tau 0$ during the calibration is basically the same as the determining method of the transmission rate $\tau$ during the temperature measurement, and thus, the detailed description will be omitted.

In view of the embodiment of the present invention, a specific influence by considering the transmission rate $\tau 0$ during the calibration will be described with figures.

For example, it is assumed that the transmission rate during the calibration is $\tau 0 = 95\%$, and the transmission rate during the actual temperature measurement of the surface temperature Tb of the temperature measurement target 101 is $T = 95\%$. This is the case where the space temperature is $Ta = 25°$ C., the space humidity is $Ha = 50\%$, the distance is $d = 10$ cm, and the detection wavelength of the infrared sensor 1 is near 6.5 μm, as described above.

In the case of the first conventional technology, an error in the radiation temperature measurement is actually zero. Furthermore, the result is appropriate. However, the zero error occurs accidentally. In other words, this is because the error becomes zero when the transmission rate $\tau 0$ during the calibration is the same as the transmission rate $\tau$ during the actual temperature measurement (for example, both are 95%). In the equations of the conventional first method (the equations indicated in Example 1 to Example 4), an error occurs when the transmission rate varies between during the calibration and during the temperature measurement.

In contrast, when applying the second conventional technology under the same condition, only the transmission rate $\tau$ during the actual temperature measurement is considered, and thus, a result of a shift by 5% of the temperature measurement value of the surface temperature Tb that must be normally right is generated. Therefore, an intention of correcting the $H_2O$ absorption adversely results in an increase in the error.

Correction equations based on them are the four equations indicated in the above-described equations (6) according to the embodiment of the present invention. More specifically, the transmission rate $\tau 0$ in the calibration step is stored in advance, and the calculation or the like is performed using the transmission rate $\tau 0$ and the transmission rate $\tau$ during the actual temperature measurement, so that the more precise surface temperature Tb of the temperature measurement target 101 can be calculated.

It is to be noted that, although the transmission rate $\tau 0$ has been indicated above as one (one type of) numerical value, without particularly limiting thereto, there may be multiple types. In particular, in a quantum-type infrared sensor, fluctuation in sensitivity exists due to the measuring device temperature Tr in many cases. Fluctuation occurs in many cases. In such a case, the calibration step is performed for multiple types of the temperatures Tr, and the transmission rate $\tau 0$ corresponding to each of the measuring device temperatures Tr is calculated and stored, so that the correction with higher accuracy becomes possible.

For example, it is assumed that the measuring device temperatures Tr measured by the contact-type thermometer attached to the infrared sensor 1 are 0° C., 25° C., and 50° C., and the transmission rates $\tau 0$ different from one another are stored in the absorption rate storage unit 5. When the actual temperature measurement is performed by the infrared sensor 1 used for measuring the measuring device temperatures Tr in an environment of the measuring device temperature Tr=35° C., preferably, the transmission rate $\tau 0$ when the measuring device temperature Tr=25° C., which is the nearest the environment where the temperature measurement is performed, is read out from the absorption rate storage unit 5 as a transmission rate storage value $\tau 0$, and the surface temperature Tb is calculated.

Furthermore, in view of the physical meaning of the four equations indicated in the equations (6) in detail, it can also be found that there are the following effects.

More specifically, the transmission rate $\tau 0$ during the calibration and the transmission rate $\tau$ during the temperature measurement have been determined above by considering only the $H_2O$ absorption influence, but it is clear that carbon dioxide ($CO_2$) and methane ($CH_4$) that are other absorbing gases can also be considered. In addition, when not considering them, in the middle-infrared band in which the $H_2O$ absorption is relatively large, the absorption of $CO_2$ and $CH_4$ is extremely small, and fluctuation due to a date and a place is significantly smaller than $H_2O$. Therefore, the same influence is included in both the transmission rate T during the temperature measurement and the transmission rate $\tau 0$ during the calibration, and thus, the influence of $CO_2$ and the like can be reduced as a result.

Finally, it will be explained that the above-described four equations can be further simplified. In many cases, the radiation temperature measuring device 100 and the infrared sensor 1 are arranged in space whose temperature and humidity are measured. In this case, the measuring device temperature Tr becomes equal to the space temperature Ta.

Therefore, the respective equations are simplified as indicated in the following equations (8).

$$V=b \cdot (\tau/\tau 0) \cdot [f(Tb)-f(Ta)]+c$$

$$V=b \cdot (\tau/\tau 0) \cdot [Tb\char`\^n-Ta\char`\^n]+c$$

$$V=b \cdot (\tau/\tau 0) \cdot [Tb\char`\^4-Ta\char`\^4]+c \qquad (8)$$

In the case of the first-order equation, by solving the equation with Tb, the following equation (9) is obtained.

$$Tb=(V-c)\div(b \cdot (\tau/\tau 0))+Ta \qquad (9)$$

When comparing the equation (9) with the first-order equation indicated in Example 2 in the conventional first method, only a multiplication (division) of the transmission rate $\tau$ during the temperature measurement calculated in the absorption rate calculation unit 3 and the storage value (the transmission rate during the calibration) $\tau 0$ stored in the absorption rate storage unit 5 is added. In any case, according to the technological reason and the like that have been described above, the influence including the $H_2O$ absorption and the other absorption of $CO_2$, $CH_4$, and the like can be corrected with a relatively-light calculation load.

Consequently, the influence due to the absorption of $H_2O$, $CO_2$, $CH_4$, and the like can be corrected with higher accuracy, and the accuracy of the radiation temperature measuring device can be more improved without a significant change to the conventional radiation temperature measuring device.

Figure 6:
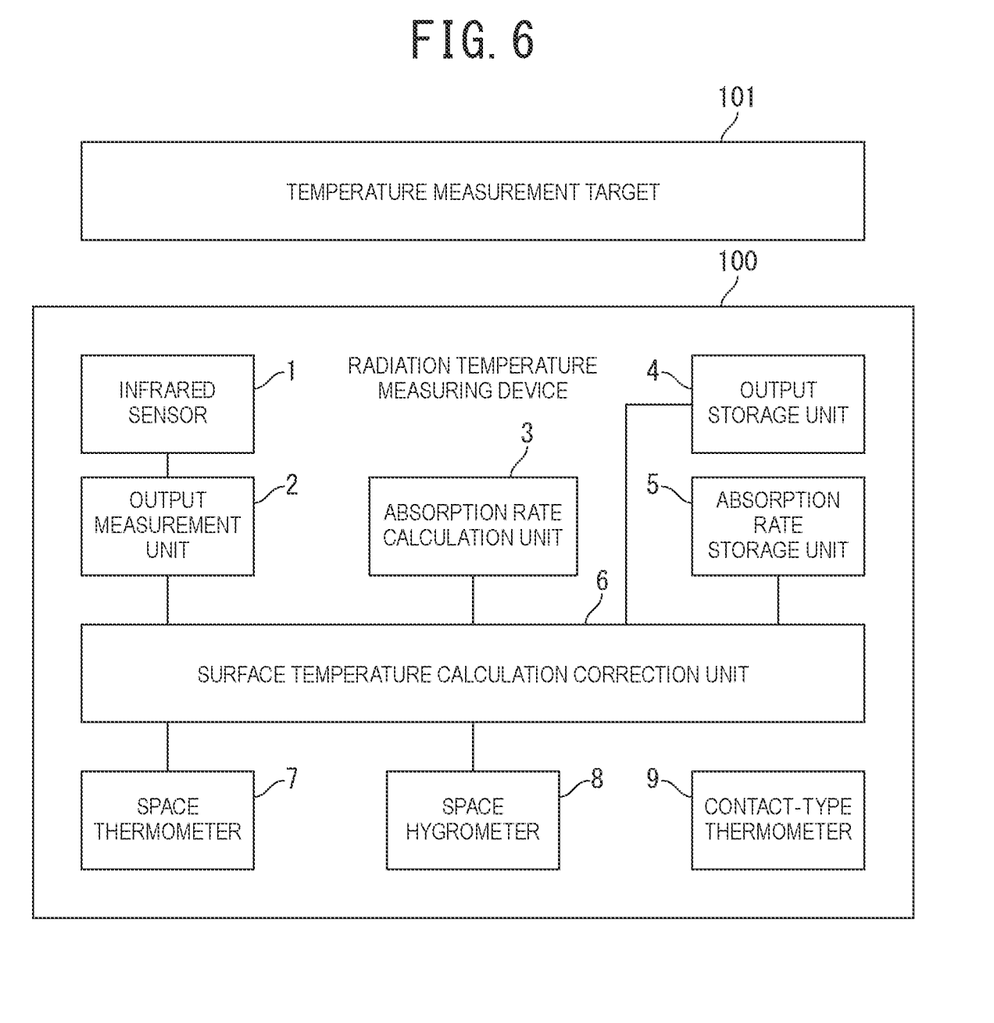
FIG. 6 is a functional block diagram illustrating an example of the radiation temperature measuring device according to one embodiment of the present invention.

FIG. 6 illustrates an example of the radiation temperature measuring device 100 including a space thermometer 7, a space hygrometer 8, and a contact-type thermometer (temperature detecting means) 9.

The space thermometer 7 measures a space temperature between the temperature measurement target 101 and the radiation temperature measuring device 100. The space hygrometer 8 measures a space humidity between the temperature measurement target 101 and the radiation temperature measuring device 100. The contact-type thermometer 9 is attached to the infrared sensor 1 and detects the temperature of the infrared sensor 1 as the temperature of the radiation temperature measuring device 100.

According to one mode of the present invention, it is possible to provide a radiation temperature measuring device using an infrared band, that can reduce an absorption influence of water vapor, carbon dioxide, methane, and the like existing in reality by a simple device and method, even when an infrared sensor configured to detect a middle-infrared band in which water vapor absorption is large is used, as a result, can perform precise correction with high accuracy.

Although the embodiment of the present invention has been described above, the above-described embodiment illustrates devices and methods to embody the technical idea of the present invention, and the technical idea of the present invention does not limit the material, shape, structure, arrangement, and the like of a component. Various changes can be added to the technical idea of the present invention within the technical scope defined by claims.

REFERENCE SIGNS LIST 1 infrared sensor
2 output measurement unit
3 absorption rate calculation unit
4 output storage unit
5 absorption rate storage unit 6 surface temperature calculation correction unit
100 radiation temperature measuring device
101 temperature measurement target

The invention claimed is:

1. A method to measure a surface temperature of an object without contact using an infrared sensor, the method comprising:

measuring an output of the infrared sensor to detect a wavelength including an absorption band by atmosphere existing between the infrared sensor and the object;

calculating an absorption rate by the atmosphere at a wavelength of the absorption band when the surface temperature of the object is measured;

storing in advance conversion information for converting the output of the infrared sensor into the surface temperature of the object;

calculating the surface temperature of the object from the output of the infrared sensor, the calculated absorption rate, and the stored conversion information;

storing in advance the absorption rate by the atmosphere at the wavelength of the absorption band depending on the stored conversion information; and correcting the calculated surface temperature of the object using the stored absorption rate, wherein the stored conversion information is a calculation equation for determining the surface temperature of the object, which is obtained by transforming a following calculation equation indicating the output of the infrared sensor:

$$V=b[[(\tau/\tau 0)\cdot f(Tb)+(1-(\tau/\tau 0))\cdot f(Ta)]-f(Tr)]+c$$

wherein V is the output of the infrared sensor, b is sensitivity of the infrared sensor, $\tau$ is a transmission rate obtained from the absorption rate $(1-\tau)$ calculated by the absorption rate calculating means, $\tau 0$ is a transmission rate obtained from the absorption rate $(1-\tau 0)$ stored in the absorption rate storing means, Tb is the surface temperature of the object, Ta is a space temperature between the object and a radiation temperature measuring device, Tr is a temperature of the radiation temperature measuring device, c is an offset of the infrared sensor, and f( ) is an arbitrary function.

2. The method according to claim 1, wherein the stored absorption rate is selected from a plurality of absorption rates set in a plurality of different temperature environments.

3. The method according to claim 2, comprising:
detecting a temperature of the radiation temperature measuring device,
wherein correcting is performed using the stored absorption rate corresponding to the detected temperature of the radiation temperature measuring device.

4. The method according to claim 1, wherein the atmosphere includes water vapor.

5. A method to measure a surface temperature of an object without contact using an infrared sensor, the method comprising:

measuring an output of the infrared sensor to detect a wavelength including an absorption band by atmosphere existing between the infrared sensor and the object;

calculating an absorption rate by the atmosphere at a wavelength of the absorption band when the surface temperature of the object is measured;

storing a preset conversion equation for converting the output of the infrared sensor into the surface temperature of the object, which includes a coefficient indicating a characteristic of the infrared sensor, and a pre-detected value of the coefficient indicating the characteristic of the infrared sensor;

calculating the surface temperature of the object from the output of the infrared sensor, the calculated absorption rate, and the conversion equation including the stored value of the coefficient indicating the characteristic of the infrared sensor; and storing in advance the absorption rate by the atmosphere at the wavelength of the absorption band when the value of the stored coefficient indicating the characteristic of the infrared sensor is detected, wherein calculating the surface temperature of the object uses the stored preset conversion equation corrected by the stored absorption rate, wherein the preset conversion equation is a calculation equation for determining the surface temperature of the object, which is obtained by transforming a following calculation equation indicating the output of the infrared sensor:

$$V=b[[(\tau/\tau 0)\cdot f(Tb)+(1-(\tau/\tau 0))\cdot f(Ta)]-f(Tr)]+c$$

wherein V is the output of the infrared sensor, b is sensitivity of the infrared sensor, $\tau$ is a transmission rate obtained from the absorption rate $(1-\tau)$ calculated by the absorption rate calculating means, $\tau 0$ is a transmission rate obtained from the absorption rate $(1-\tau 0)$ stored in the absorption rate storing means, Tb is the surface temperature of the object, Ta is a space temperature between the object and a radiation temperature measuring device, Tr is a temperature of the radiation temperature measuring device, c is an offset of the infrared sensor, and f( ) is an arbitrary function.

6. A method to measure a surface temperature of an object without contact using an infrared sensor, the method comprising:

measuring an output of the infrared sensor to detect a wavelength including an absorption band by atmosphere existing between the infrared sensor and the object;

calculating an absorption rate by the atmosphere at a wavelength of the absorption band when the surface temperature of the object is measured;

storing preset conversion information for converting the output of the infrared sensor into the surface temperature of the object;

storing in advance the absorption rate by the atmosphere at the wavelength of the absorption band when the conversion information is set; and calculating the surface temperature of the object from the output of the infrared sensor, the calculated absorption rate, the stored absorption rate, and the stored preset conversion information, wherein the stored preset conversion information is a calculation equation for determining the surface temperature of the object, which is obtained by transforming a following calculation equation indicating the output of the infrared sensor:

$$V=b[[(\tau/\tau 0)\cdot f(Tb)+(1-(\tau/\tau 0))\cdot f(Ta)]-f(Tr)]+c$$

wherein V is the output of the infrared sensor, b is sensitivity of the infrared sensor, $\tau$ is a transmission rate obtained from the absorption rate $(1-\tau)$ calculated by the absorption rate calculating means, $\tau 0$ is a transmission rate obtained from the absorption rate $(1-\tau 0)$ stored in the absorption rate storing means, Tb is the surface temperature of the object, Ta is a space temperature between the object and a radiation temperature measuring device, Tr is a temperature of the radiation temperature measuring device, c is an offset of the infrared sensor, and f( ) is an arbitrary function.

* * * * *